Dec. 19, 1967 E. OTTERSBACH ET AL 3,358,305
SCREW STOCK

Filed Jan. 19, 1966 2 Sheets-Sheet 1

INVENTOR
Erwin Ottersbach
Peter Zimmermann
BY

Dec. 19, 1967  E. OTTERSBACH ET AL  3,358,305
SCREW STOCK

Filed Jan. 19, 1966  2 Sheets-Sheet 2

INVENTOR
Erwin Ottersbach
Peter Zimmermann
BY

# United States Patent Office 3,358,305
Patented Dec. 19, 1967

3,358,305
SCREW STOCK
Erwin Ottersbach, Singen, and Peter Zimmermann, Stahringen, near Constance, Germany, assignors to Georg Fischer Aktiengesellschaft, Schaffhausen, Switzerland
Filed Jan. 19, 1966, Ser. No. 521,624
Claims priority, application Switzerland, Jan. 29, 1965, 1,292/65
3 Claims. (Cl. 10—124)

ABSTRACT OF THE DISCLOSURE

The present invention relates to a thread cutting device, especially for cutting a conical thread onto a pipe end while a portion of said thread cutting device is clamped fast in the pipe end. The thread cutting device according to the invention is characterized by a central bushing with two thread portions respectively having a different pitch. One of said thread portions the pitch of which corresponds to the pitch of the thread to be cut meshes with a guiding nut arranged on the housing of the cutting device, whereas the other thread portion the pitch of which is less than the pitch of the thread to be cut meshes with a thread cutting jaw adjusting nut. The invention is furthermore characterized in that the thread cutting jaw adjusting nut, which is axially displaceable in a bore of the housing of said cutting device, is operatively connected to adjusting nuts arranged on thread cutting jaws which are radially displaceable in the said housing. This operative connection is effected by an adjusting ring inclined with regard to the tool axis.

---

The present invention relates to a screw stock for cutting thread on pipes while the tool is held stationary in the pipe end. Screw stocks of the above mentioned type are known for cutting cylindrical pipe thread.

It is an object of the present invention to provide a screw stock which will permit the cutting of conical thread on pipes.

It is another object of this invention to provide a screw stock as set forth in the preceding paragraph which is simple and reliable in construction and operation.

These and other objects and advantages of the present invention will appear more clearly from the following specification in connection with the accompanying drawings, in which.

The screw stock according to the present invention is characterized primarily by a central bushing with two threads of different pitch. One of said threads which corresponds to the pitch of the thread to be cut engages a guiding nut arranged on a stock housing, whereas the other thread, the pitch of which is less than the pitch of the thread to be cut, engages a screwing jaw adjusting bushing. Said last mentioned bushing, which is axially displaceable in a bore of the stock housing, is operatively connected to adjusting nuts on screwing jaws which are radially displaceable in the stock housing. This operative connection is effected by an adjusting ring which is inclined to the axis of the tool.

Figure 1:
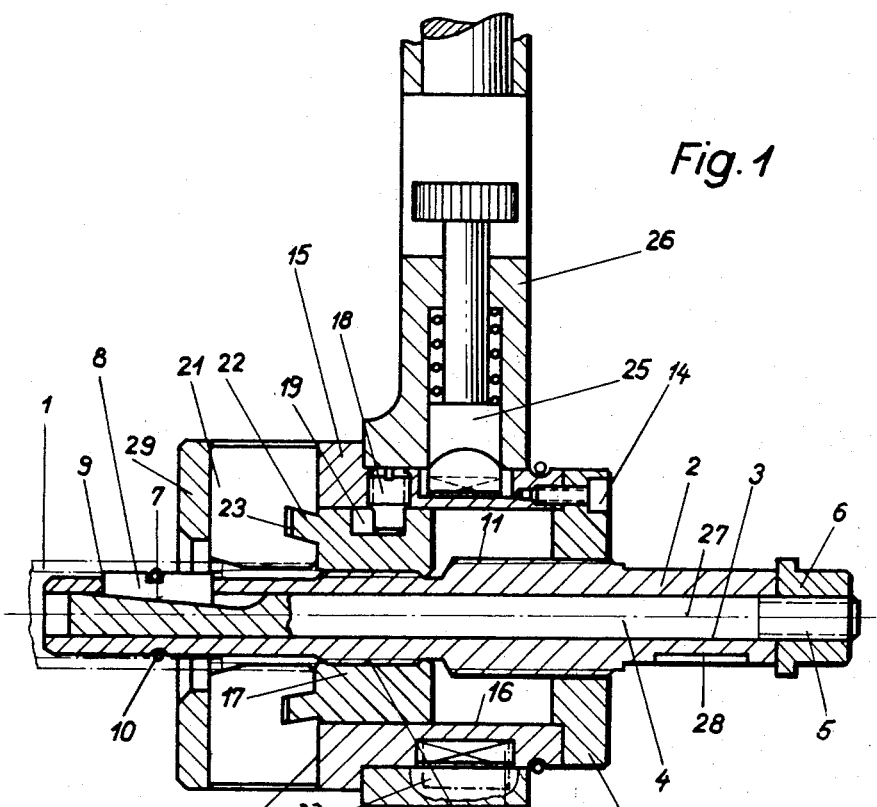
FIG. 1 illustrates a section through a screw stock according to the present invention.

Referring now more specifically to the drawings, FIG. 1 illustrates in dot-dash lines on the left-hand side thereof a pipe end 1 to be provided with a conical thread. This pipe end may be clamped fast and supported in any convenient manner. The screw stock primarily comprises a bushing 2 with a central continuous bore 3. A clamping bar 4 having one end provided with a thread for a nut 6 and having its other end provided with an inclined surface 7 for a clamping key 8 is displaceable along an axis 27 within said bore 3. Clamping key 8 is radially displaceable in a radial recess 9 of bushing 2 and is secured by means of a spring member 10 against accidentally dropping out.

Provided on bushing 2 are two threads 11 and 12 of different pitch. Thread 11 meshes with a guiding nut 13 which by means of screws 14 is connected to a screw stock housing 15. A jaw adjusting nut 17 is axially displaceable in a bore 16 of housing 15. The axial displacement stroke of said nut 17 is limited by a trunnion screw 18 arranged in housing 15 and engaging a groove 19 in nut 17 which in its turn meshes with thread 12 of bushing 2.

Housing 15 has a plurality of radial grooves 20 in each of which a thread cutting jaw 21 is displaceable. A cover 29, which is connected to housing 15 in any convenient manner for instance by screws, maintains the cutting jaws 21 in axial direction. One end face of nut 17 is provided with a jaw adjusting ring 22 which engages corresponding grooves 23 of the cutting jaws 21. Adjusting ring 22 is inclined with regard to the axis 27. The circumferential surface of housing 15 is provided with a plurality of recesses 24 adapted to be engaged in a manner known per se by a ratchet bolt 25 of a ratchet 26.

The screw stock described above operates in the following manner. It may be assumed that a pipe end 1 is to be provided with a conical thread having a conicity of 1:16 with 14 threads per 1". To this end, bushing 2 is by means of clamping key 8 inserted into the end of pipe 1 until said pipe abuts the front end of cutting jaws 21. When this occurs, nut 6 is tightened and thereby bushing 2 with the screw stock is clamped fast relative to pipe 1. The thread in the guiding nut 13 and the thread 11 on bushing 2 have the desired thread pitch of 14 threads per 1". The thread in nut 17 and the thread 12 on bushing 2 have a pitch which is less by a certain amount so that nut 17 which is prevented from rotation in bore 16 by trunnion screw 18 and groove 19, will advance on thread 12 at a lower rate than the housing 15 which carries the guiding nut 13, the cutting jaws 21, and ratchet 26. As a result thereof, the cutting jaws 21 will in radial direction slowly move outwardly and thereby will on pipe 1 produce a conical thread.

Figure 2:
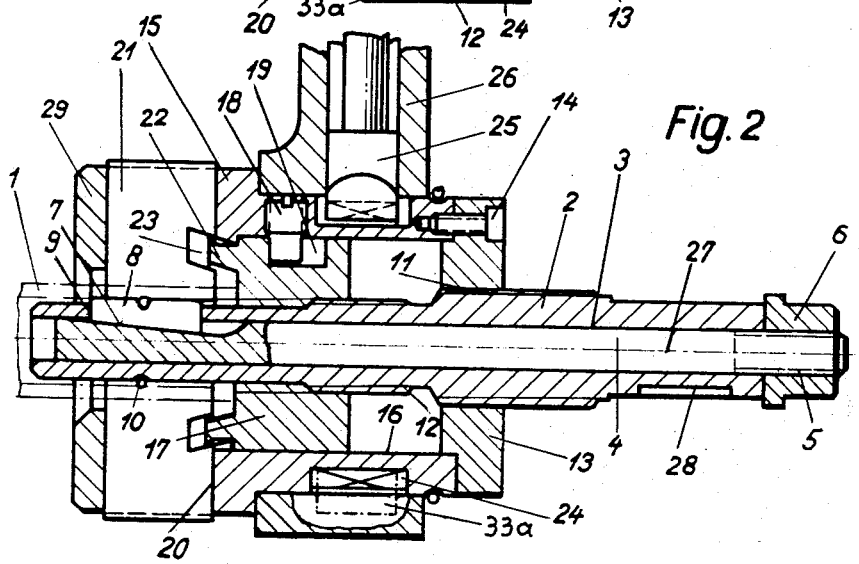
FIG. 2 shows a section similar to that of FIG. 1 but shows the screw stock in a different position of operation.

FIG. 2 shows the position of jaws 21 shortly before the cutting operation has been completed. The conicity of the produced thread on pipe 1 with a predetermined pitch determined by the thread 11 and guiding nut 13 will thus be produced by the different pitch of thread 11 and thread 12 and by the inclination of the jaw adjusting ring 22 with regard to the displacement axis 27 of the screw stock housing 15.

Figure 3:
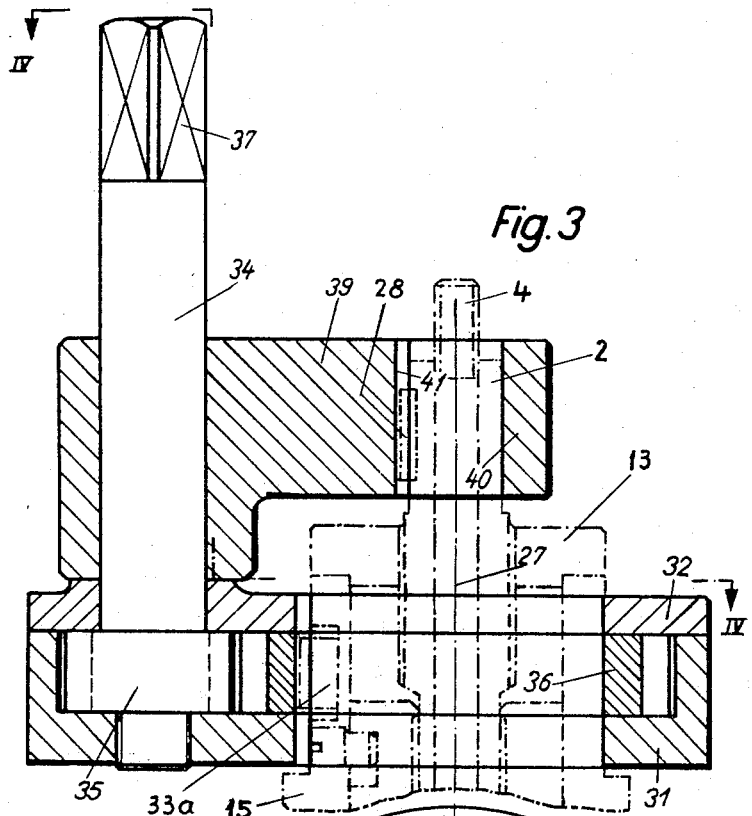
FIG. 3 shows an additional gear system for use in connection with a screw stock according to the invention, the section of FIG. 3 being taken along the line III—III of FIG. 4.
Figure 4:
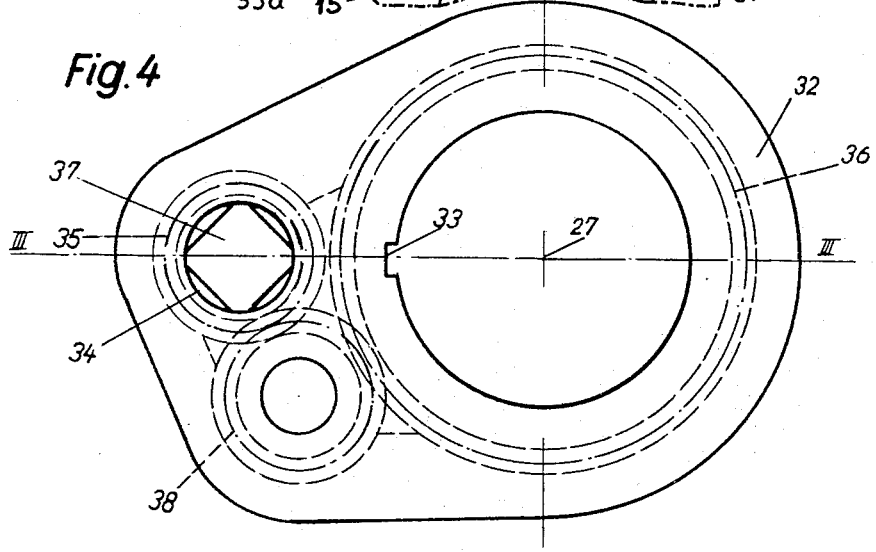
FIG. 4 is a section along the line IV—IV of FIG. 3.

When it is desired to cut larger threads, the torque adapted to be produced on ratchet 26 frequently does not suffice so that instead of ratchet 26 (FIG. 1) an auxiliary transmission according to FIG. 3 may be employed.

After ratchet 26 (FIG. 1) has been removed, a housing 31 is mounted on the screw stock housing 15, housing 31 having cover 32 connected thereto in any convenient manner for instance by screws. By means of a wedge or key 33a which engages a wedge path 33 of a gear ring 36 and is located in one of the recesses 24 of housing 15, the two machine parts 15 and 36 are connected to each other.

Between housing 31 and cover 32 there is journalled a pinion shaft 34 with a pinion 35 and a square head 37. Pinion 35 meshes with a pinion 38 which in its turn is in meshing engagement with gear ring 36. Freely rotatably mounted on shaft 34 is a guiding member 39. A bore 40 with a wedge path 41 will in assembled condition fit on that portion of bushing 2 which is provided with wedge groove 28. For purposes of cutting thread, a suitable lever or wrench is mounted on the square head 34 of pinion shaft 34.

The screw stock according to the present invention makes it possible to cut a conical thread on a short pipe end protruding from a wall inasmuch as the clamping and thus the centering of the screw stock on the pipe can be effected by elements within said screw stock. The design of the above described screw stock is, of course, not limited to the particular conical thread referred to above but can with a corresponding change in the elements also be used for cutting any other conical thread.

It is furthermore to be understood that the present invention is, by no means, limited to the particular arrangements shown in the drawings but also comprises any modifications within the scope of the appended claims.

What we claim is:

1. A thread-cutting device, especially for cutting a conical thread onto a pipe, which includes: housing means, first nut means connected to said housing means, thread carrier means having a first circumferential thread with a pitch corresponding to the pitch of the thread to be cut and also having a second circumferential thread with a pitch less than the pitch of said first thread, said first thread being in threaded engagement with said first nut means, second nut means axially displaceable in said housing means and in threaded engagement with said second thread, said housing means being rotatable relative to said first and second nut means to effect an axial movement of the latter relative to said housing means, and thread-cutting means radially adjustably mounted in said housing means for cutting a thread into a pipe, said thread cutting means and said second nut means being in operative engagement with each other to selectively bring about a radial movement of said thread-cutting means in response to an axial movement of said second nut means relative to said housing means.

2. A device according to claim 1, in which said thread carrier means comprise a tubular member having an end portion adapted to be introduced into a pipe onto which a thread is to be cut, and wedge means arranged in said end portion and operable to clamp a pipe into which the thread is to be cut onto said end portion.

3. A device according to claim 1, which includes torque exerting means including gear transmission means, said torque exerting means being operable selectively to rotate said housing means and thereby said first and second nut means.

References Cited

UNITED STATES PATENTS

| 685,819 | 11/1901 | Connell | 10—121 |
|---|---|---|---|
| 1,053,482 | 2/1913 | Dreier | 10—121 |
| 2,746,066 | 5/1956 | Finn | 10—120.5 X |

FOREIGN PATENTS 624,899  6/1949  Great Britain.

HARRISON L. HINSON, *Primary Examiner.*